(12) United States Patent
Ma et al.

(10) Patent No.: US 11,921,505 B2
(45) Date of Patent: Mar. 5, 2024

(54) UNMANNED SURFACE VEHICLE CONTROL METHOD BASED ON SWITCHING T-S FUZZY SYSTEM UNDER DOS ATTACK

(71) Applicant: WUHAN UNIVERSITY OF TECHNOLOGY, Hubei (CN)

(72) Inventors: Yong Ma, Hubei (CN); Hao Li, Hubei (CN); Zongqiang Nie, Hubei (CN)

(73) Assignee: WUHAN UNIVERSITY OF TECHNOLOGY, Hubei (CN)

( * ) Notice: Subject to any disclaimer, the term of this patent is extended or adjusted under 35 U.S.C. 154(b) by 386 days.

(21) Appl. No.: 17/296,980

(22) PCT Filed: Nov. 18, 2020

(86) PCT No.: PCT/CN2020/129812
§ 371 (c)(1),
(2) Date: May 26, 2021

(87) PCT Pub. No.: WO2022/000945
PCT Pub. Date: Jan. 6, 2022

(65) Prior Publication Data
US 2022/0317687 A1     Oct. 6, 2022

(30) Foreign Application Priority Data

Jul. 1, 2020  (CN) .......................... 202010628647.4

(51) Int. Cl.
*B63B 79/20*       (2020.01)
*B63B 79/40*       (2020.01)
(Continued)

(52) U.S. Cl.
CPC .......... *G05D 1/0088* (2013.01); *B63B 79/20* (2020.01); *B63B 79/40* (2020.01); *G05D 1/0206* (2013.01);
(Continued)

(58) Field of Classification Search
CPC ... B63B 2035/006; B63B 79/20; B63B 79/40; G05D 1/0088; G05D 1/0206;
(Continued)

(56) References Cited

U.S. PATENT DOCUMENTS

| 2008/0086434 | A1* | 4/2008 | Chesla | ................ | H04L 63/1458 |
| | | | | | 706/12 |
| 2017/0214713 | A1 | 7/2017 | Doron et al. | | |
| 2022/0377094 | A1* | 11/2022 | Islam | ....................... | H04L 12/40 |

FOREIGN PATENT DOCUMENTS

| CN | 101727559 | 6/2010 |
| CN | 105515866 | 4/2016 |

(Continued)

OTHER PUBLICATIONS

"International Search Report (Form PCT/ISA/210) of PCT/CN2020/129812," dated Mar. 29, 2021, pp. 1-5.
(Continued)

*Primary Examiner* — Hunter B Lonsberry
*Assistant Examiner* — Matthew J. Reda
(74) *Attorney, Agent, or Firm* — True Shepherd LLC; Andrew C. Cheng

(57) ABSTRACT

The present invention discloses a collaborative design method using an event-triggered scheme (ETS) and a Takagi-Sugeno (T-S) fuzzy $H_\infty$ controller in a network environment. For the problem about the unmanned surface vehicle control based on a switching T-S fuzzy system under an aperiodic DoS attack, the present invention provides an H∞ controller design method based on the event-triggered scheme. The characteristics of the unmanned surface vehicle system under the DoS attack are analyzed, and external disturbance in the navigation process is added into an unmanned surface vehicle motion model to establish an unmanned surface vehicle switching system model. The stability of the system is analyzed by piecewise Lyapunov
(Continued)

functionals, such that controller gain and event-triggered scheme weight matrix parameters are obtained, thus ensuring that a networked unmanned surface vehicle navigation system has the ability to resist the DoS attack and the external disturbance.

6 Claims, 4 Drawing Sheets

(51) Int. Cl.
  *G05D 1/00* (2006.01)
  *G08G 3/00* (2006.01)
  *H04L 9/40* (2022.01)
(52) U.S. Cl.
  CPC ....... *G08G 3/00* (2013.01); *G05D 2201/0207* (2013.01); *H04L 63/145* (2013.01)
(58) Field of Classification Search
  CPC .......... G05D 2201/0207; H04L 63/145; H04L 63/1458; G08G 3/00
  See application file for complete search history.

(56) References Cited

FOREIGN PATENT DOCUMENTS

| | | |
|---|---|---|
| CN | 107390529 | 11/2017 |
| CN | 109243165 | 1/2019 |
| CN | 110673611 | 1/2020 |
| CN | 110962839 A * | 4/2020 |
| CN | 111830976 | 10/2020 |

OTHER PUBLICATIONS

Shen Yubin et al., "Stability analysis of event-triggered networked control systems under attack," Journal of Electronic Measurement and Instrumentation, vol. 34, Mar. 2020, pp. 51-57.

* cited by examiner

UNMANNED SURFACE VEHICLE CONTROL METHOD BASED ON SWITCHING T-S FUZZY SYSTEM UNDER DOS ATTACK

CROSS-REFERENCE TO RELATED APPLICATION

This application is a 371 of international application of PCT application serial no. PCT/CN2020/129812, filed on Nov. 18, 2020, which claims the priority benefit of China application no. 202010628647.4, filed on Jul. 1, 2020. The entirety of each of the above mentioned patent applications is hereby incorporated by reference herein and made a part of this specification.

TECHNICAL FIELD

The present invention belongs to the technical fields of network security and unmanned surface vehicle motion control, and provides a collaborative design method using an event-triggered scheme (ETS) and a Takagi-Sugeno (T-S) fuzzy $H_\infty$ controller in a network environment particularly under the condition that an unmanned surface vehicle control system is subjected to denial of service (DoS) attack, communication delay and network bandwidth limitation.

BACKGROUND

To realize autonomous navigation of an unmanned surface vehicle, generally in a network environment, the unmanned surface vehicle is effectively controlled by a shore-based control center. Data transmission of navigation information and control signals between the unmanned surface vehicle and the control center is realized by the network. Therefore, the unmanned surface vehicle, the shore-based control center and the communication network jointly constitute networked control systems (NCSs).

The networked control systems are widely applied in the fields of intelligent industrial production, transportation and the like, such as robots, unmanned vehicles, unmanned surface vehicles, etc. The emergence of the networked control systems provides great convenience for actual production and life, but at the same time, since the networked control systems connect network space and controlled objects in a unique way, there will be some inevitable challenges. Research on the network security problems, particularly the network attack problems, has been widely concerned by numerous scholars. Therefore, in the unmanned surface vehicle control system, it is of great significance to consider the influence of the network attacks on the performance of the system into the design of a controller.

The network security problem is a major research hotspot in the networked control systems. The networked control systems often adopt a distributed control mode, and the acquired dynamic information and various control signals are transmitted through network communication channels. With the increasing openness of the network and the continuous expansion of the network scale, it is bound to increase the possibility of network attacks, such as spoofing attack, denial of service (DoS) attack and the like. The DoS attack will occupy the communication channel and consume the network bandwidth, thus blocking the normal communication. The blockage of signal transmission may lead to the instability of the entire control system, thereby bringing new problems to the research on a control theory. For the unmanned surface vehicle control system in the network environment, hackers may choose to attack the unmanned surface vehicle or the shore-based control center in various forms in any communication links of the signal transmission. Therefore, the collaborative design based on the event-triggered scheme and the T-S fuzzy $H_\infty$ controller under the DoS attack is an urgent problem to be solved in motion control of the unmanned surface vehicle.

SUMMARY

In view of the above defects or improvement requirements in the prior art, the present invention provides an unmanned surface vehicle control method based on a switching T-S fuzzy system under a DoS attack. The method may ensure the mean square stability of a control system, thus solving the problem about the motion control of the unmanned surface vehicle under the DoS attack.

To achieve the above objective, according to one aspect of the present invention, an unmanned surface vehicle control method based on a switching T-S fuzzy system under a DoS attack is provided. The method includes:
  S1: establishing a motion mathematical model of an underactuated unmanned surface vehicle;
  S2: linearizing the motion mathematical model of the underactuated unmanned surface vehicle by a T-S fuzzy method;
  S3: adding external disturbance in a navigation process into the linearized unmanned surface vehicle motion model to establish a switching system analysis model under the DoS attack;
  S4: based on the switching system analysis model under the DoS attack, designing an event-triggered mechanism and a T-S fuzzy $H_\infty$ controller under a discrete system; and
  S5: analyzing the stability of the system by piecewise Lyapunov functionals so as to obtain controller gain and event-triggered mechanism weight matrix parameters.

Preferably, the step S1 includes:
  S1.1: considering a hull fixed reference system and an earth fixed reference system, selecting a central position of the unmanned surface vehicle as an origin of coordinates, and obtaining an unmanned surface vehicle dynamic model through a kinetic equation and a kinematical equation of the unmanned surface vehicle in three degrees of freedom of swaying, surging and yawing;
  S1.2: performing coordinate transformation based on the unmanned surface vehicle dynamic model and applying to a control system model to obtain an improved mathematical model suitable for mean square stability analysis; and
  S1.3: transforming the improved mathematical model suitable for mean square stability analysis into a state-space equation model.

Preferably, the improved mathematical model suitable for mean square stability analysis is $$\begin{cases} \dot{u} = \dfrac{1}{m_{11}}(m_{22}vr - d_{11}u + \tau_1) \\ \dot{v} = \dfrac{1}{m_{22}}(m_{11}ur - d_{22}v) \\ \dot{r} = \dfrac{1}{m_{33}}((m_{22}-m_{11})uv - d_{33}r + \tau_3) \\ \dot{s}_1 = u + s_2 r \\ \dot{s}_2 = v - s_1 r \\ \dot{s}_3 = r \end{cases},$$

wherein $m_{11}$, $m_{22}$, $m_{33}$ represent hull inertial parameters, u, v respectively represent linear velocities of surging and swaying of the three degrees of freedom of the unmanned surface vehicle, τ represents an angular velocity of yawing of the three degrees of freedom of the unmanned surface vehicle, $d_{11}$, $d_{22}$, $d_{33}$ represent hydrodynamic damping coefficients, $τ_1$, $τ_3$ respectively represent a longitudinal propulsive force and a steering torque, and $s_1$, $s_2$ and $s_3$ represent coordinates after transformation.

Preferably, the state-space equation model is $\dot{x}(k)=A_0 x(k)+B_0 u(k)$, wherein $$x(t) = [x_1 \; x_2 \; x_3 \; x_4 \; x_5 \; x_6]^T = [u \; v \; r \; s_1 \; s_2 \; s_3]^T,$$

$$u(t) = [u_1 \; u_2] = [\tau_1 \; \tau_2]^T, A_0 = \begin{bmatrix} -\frac{d_{11}}{m_{11}} & \frac{m_{22}}{m_{11}} x_3 & 0 & 0 & 0 & 0 \\ -\frac{d_{11}}{m_{22}} x_3 & -\frac{d_{22}}{m_{22}} & 0 & 0 & 0 & 0 \\ \frac{m_{11}-m_{22}}{m_{33}} x_2 & 0 & -\frac{d_{33}}{m_{33}} & 0 & 0 & 0 \\ 1 & 0 & 0 & 0 & x_3 & 0 \\ 0 & 1 & 0 & -x_3 & 0 & 0 \\ 0 & 0 & 1 & 0 & 0 & 0 \end{bmatrix},$$

$$\text{and } B_0 = \begin{bmatrix} \frac{1}{m_{11}} & 0 \\ 0 & 0 \\ 0 & \frac{1}{m_{33}} \\ 0 & 0 \\ 0 & 0 \\ 0 & 0 \end{bmatrix}.$$

Preferably, the step S2 includes:

when nonlinear terms $x_2$ and $x_3$ exist in a parameter matrix $A_0$, according to the change range of the nonlinear terms, determining system fuzzy sets: $M_i(x_2(k))$ and $N_i(x_3(k))$ by the T-S fuzzy method, and in combination with a method for transforming a continuous system into a discrete system, describing the corresponding fuzzy system as: $r_i$: if $x_2(k) \in M_i(x_2(k))$ and $x_3(k) \in N_i(x_3(k))$, $$\begin{cases} x(k+1) = A_i x(k) + B_i u(k) \\ x(k) = \phi(k), k \in [-d_M, 0) \end{cases} (i = 1, 2, \cdots r),$$

wherein i is a fuzzy rule number, $r_i$ represents the $i^{th}$ fuzzy rule, and $d_M \in N$ represents a delay upper bound; and determining an overall model of the unmanned surface vehicle fuzzy system as $x(k+1)=Ax(k)+Bu(k)$, wherein $A=\sum_{i=1}^{r} h_i(x(k))A_i$, $B=\sum_{i=1}^{r} h_i(x(k))B_i$ and $h_i(x(k))$ represent a membership function determined by the fuzzy set, $M_i(x_2(k))$ and $N_i(x_3(k))$ represent system fuzzy sets, $A_i$ and $B_i$ represent system parameter matrixes of the unmanned surface vehicle, $\phi(k)$ represents a rolling angle, N represents a natural number, and τ represents an angular velocity of yawing of the three degrees of freedom of the unmanned surface vehicle.

Preferably, the step S3 includes:

S3.1 based on a networked unmanned surface vehicle T-S fuzzy control system and in view of the external disturbance in a navigation environment, re-determining an unmanned surface vehicle fuzzy system;

S3.2: under an aperiodic DoS attack, controller input is unable to be transmitted to an actuator unit in the active time period of the DoS attack, then a control input signal is not transmitted at this time, thus determining a T-S fuzzy controller for a networked unmanned surface vehicle system; and S3.3: in combination with the re-determined unmanned surface vehicle fuzzy system and the T-S fuzzy controller for the networked unmanned surface vehicle system, obtaining a switching system analysis model:

$$x(k+1) = \begin{cases} \sum_{i=1}^{r}\sum_{j=1}^{r} h_i(x(k))h_j(\theta(k))[A_i x(k) + B_i K_j e(k) + \\ B_i K_j x(k-d(k)) + E_i \omega(k)], k \in D_{1,n-1} \\ \sum_{i=1}^{r}\sum_{j=1}^{r} h_i(x(k))h_j(\theta(k))[A_i x(k) + E_i \omega(k)], k \in D_{2,n-1} \end{cases}$$

$$z(k) = \sum_{i=1}^{r} h_i(x(k))(C_i x(k) + D_i u(k))$$

$$x(k) = \phi(k), k \in [-d_M, 0]$$

when the unmanned surface vehicle T-S fuzzy control system is under the DoS attack, wherein $\omega(k)=[\omega(k) \; \omega_2(k) \; \omega_3(k)]^T$ represents external disturbance in the navigation process, z(k) represents a state measurement vector, $C_i$, $D_i$ and $E_i$ are real matrixes with appropriate dimensions and respectively represent a measurement state matrix, a measurement input matrix and an environment disturbance matrix of corresponding linear sub-systems, $h_j(\theta(k))$ represents a membership function of the fuzzy controller, $K_j$ represents a controller gain of the fuzzy system, e(k) represents a difference value between the current sampling signal and the last trigger signal, d(k) represents a variable relevant to communication delay after an event-triggered scheme is established, $\mathcal{R}_n=[k_t+n+\tau_{k_t+n}, \; k_{t+1}n+1+\tau_{k_{t+1}+n+1})$, $n=0, 1, \ldots, n_k$, $n_k=k_{t+1}-k_t-1$, $k_t$ and $k_{t+1}$ represent the current trigger time and the next trigger time, $\tau_{k_t+n}$ and $\tau_{k_{t+1}+n+1}$ represent delay of the current trigger time and delay of the next trigger time, $\mathcal{D}_{1,n-1}$ and $\mathcal{D}_{2,n-1}$ represent parameter sets, $\phi(k)$ represents a rolling angle, and $d_M$ represents a delay upper bound.

Preferably, the final system analysis model is obtained by $$\begin{cases} x(k+1) = \sum_{i=1}^{r}\sum_{j=1}^{r} h_i(x(k))h_j(\theta(k))[A_ix(k) + B_iK_jx(k-d(k)) + B_iK_je(k)], k \in \mathcal{R}_n \\ x(k) = \aleph(k), k \in [-d_M, 0] \end{cases},$$

$\mathcal{H}(k)$ representing an initial state of the unmanned surface vehicle; and the described event-triggered scheme is determined by $e^T(k)We(k) \leq \sigma x^T(k-d(k))Wx(k-d(k))$, $n=0, 1, \ldots, n_k$, $n_k=k_{t+1}-k_t-1$, wherein $k_t$ and $k_{t+1}$ represent the current trigger time and the next trigger time, $\tau_{k_t+n}$ and $\tau_{k_{t+1}+n+1}$ represent delay of the current trigger time and delay of the next trigger time, $e(k)$ represents a difference value between the current sampling signal and the last trigger signal, $x(k-d(k))$ represents a state of the last trigger time, $\sigma$ is a trigger parameter, $W$ is a trigger parameter, and $d(k)$ represents communication delay of the system.

According to another aspect of the present invention, a computer readable storage medium is provided. A computer program is stored on the computer readable storage medium. The computer program, when being executed by a processor, enables the processor to implement the steps of any one of the above methods.

In general, compared with the prior art, the above technical solution conceived by the present invention can achieve the following beneficial effects:

By the collaborative design method based on the event-triggered scheme and the T-S fuzzy $H_\infty$ controller in the network environment according to the present invention, the networked unmanned surface vehicle control system can effectively solve the problem about the motion control of the unmanned surface vehicle while resisting the DoS attack. Reasonable piecewise Lyapunov functionals are established by an analysis method based a switching model, and the mean square stability result of the control system can be obtained according to a linear matrix inequality. For the underactuated and nonlinear characteristics of the system, the T-S fuzzy $H_\infty$ controller is adopted, such that better control effect may be achieved while the design process of the system control rule is simplified.

BRIEF DESCRIPTION OF THE DRAWINGS

To describe the technical solutions in the embodiments of the present invention or in the prior art more clearly, the accompanying drawings required in the embodiments will be briefly described below. Apparently, the accompanying drawings in the following description show merely some embodiments of the present invention, and a person of ordinary skill in the art may still derive other accompanying drawings from these accompanying drawings without creative efforts.

DETAILED DESCRIPTION OF THE EMBODIMENTS

To make the objectives, technical solutions, and advantages of the present invention clearer, the present invention will be further described below in detail with reference to the accompanying drawings and embodiments. It should be understood that the specific embodiments described herein are only used to explain the present invention and are not used to limit the present invention. In addition, the technical features involved in the various embodiments of the present invention described below may be combined with each other as long as they do not constitute a conflict with each other.

An objective of the present invention is to provide a collaborative design method of an event-triggered scheme and T-S fuzzy control for an unmanned surface vehicle system, thereby solving the problems of communication delay and network resource limitation on the premise of ensuring the system control performance. The present invention will be further described in detail below with reference to the accompanying drawings and specific embodiments.

Figure 1:
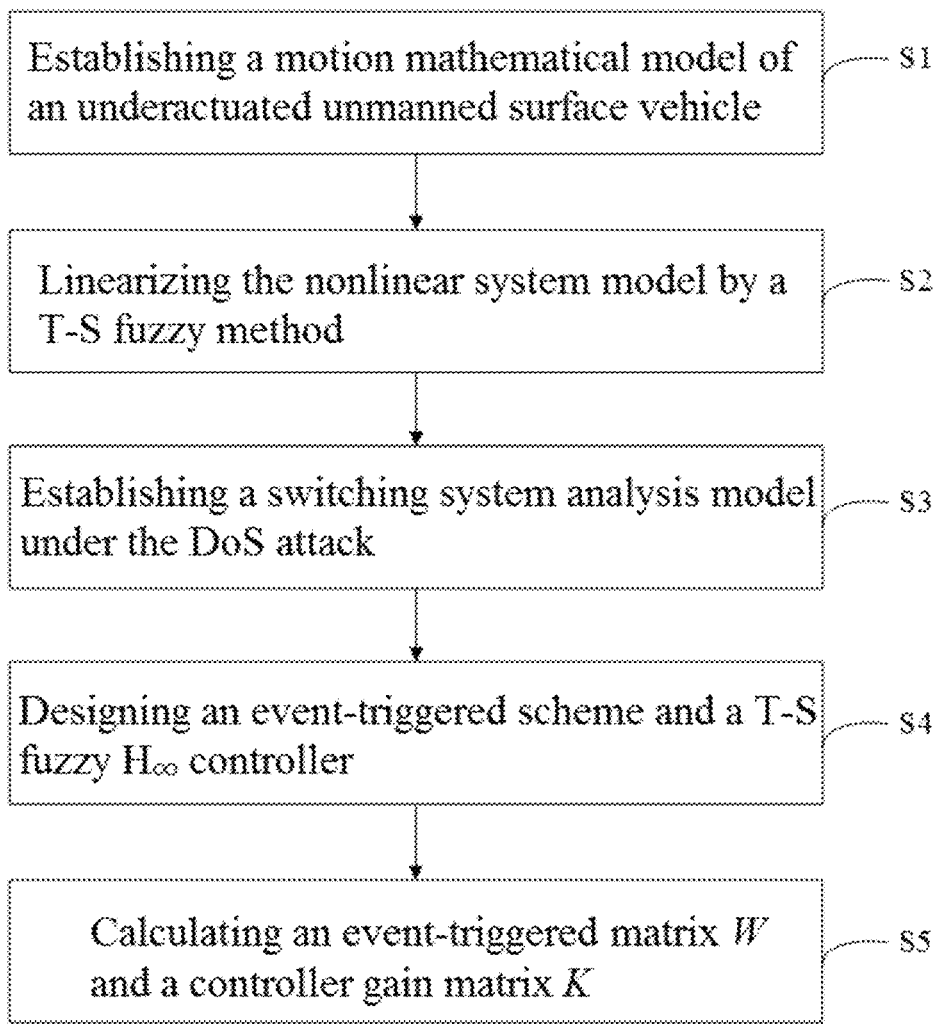
FIG. 1 is a flowchart of a collaborative design method of an event-triggered scheme and T-S fuzzy controller according to an embodiment of the present invention.

As shown in FIG. 1 which is a flowchart of a collaborative design method of an event-triggered scheme and T-S fuzzy control according to an embodiment of the present invention, in view of the DoS attack, communication delay and network resource limitation, collaborative design of the event-triggered scheme and the T-S fuzzy $H_\infty$ controller, applied to the unmanned surface vehicle control system, is a mean square stability analysis method for a controlled system, including the following steps:

S1: a motion mathematical model of an underactuated unmanned surface vehicle is established.

Figure 2:
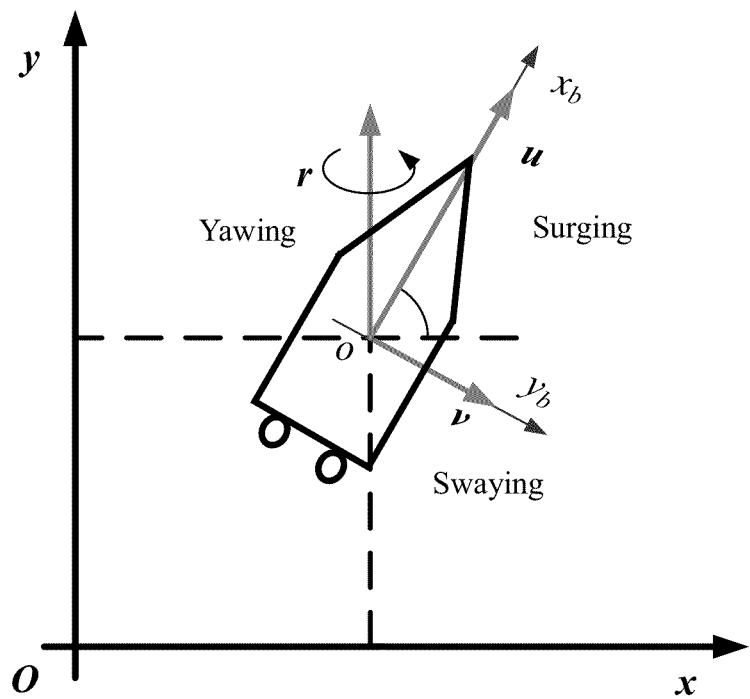
FIG. 2 is a descriptive diagram of a three-degree-of-freedom motion variable of an unmanned surface vehicle according to an embodiment of the present invention.

As shown in FIG. 2, a hull fixed reference system and an earth fixed reference system are considered, wherein $x_b$ and $y_b$ respectively represent a longitudinal axis and a horizontal axis of the hull fixed reference system, and $x$ and $y$ respectively represent a horizontal axis and a longitudinal axis of the earth fixed reference system. The central position of the unmanned surface vehicle is selected as an origin of coordinates. The influence of a disturbing force is temporarily ignored during modeling. A kinetic equation and a kinematical equation of the unmanned surface vehicle in three degrees of freedom of swaying, surging and yawing may be represented as:

$$M\dot{\mathcal{V}} + C(\mathcal{V})\mathcal{V} + D\mathcal{V} = \tau$$
$$\dot{\eta} = J(\psi)\mathcal{V} \qquad (1)$$

wherein $M=\text{diag}(m_{11}, m_{22}, m_{33})$ represents an inertial parameter of the unmanned surface vehicle, $m_{11}, m_{22}, m_{33}$ represents hull inertial parameters, $\mathcal{V} = [u\ v\ r]^T$ represents a speed vector of the unmanned surface vehicle, u, v respectively represent linear velocities of surging and swaying of the three degrees of freedom of the unmanned surface vehicle, r represents an angular velocity of yawing of the three degrees of freedom of the unmanned surface vehicle, $D = \text{diag}(d_{11}, d_{22}, d_{33})$ represents a hydrodynamic resistance parameter, $d_{11}$, $d_{22}$, $d_{33}$ represent hydrodynamic damping coefficients, $\tau = [\tau_1\ 0\ \tau_3]^T$ represents a control input vector, $\tau_1$, $\tau_3$ respectively represent a longitudinal propulsive force and a steering torque, $\eta = [x\ y\ \psi]^T$ represents a position vector of the unmanned surface vehicle, x, y respectively represent positions of surging and swaying of the three degrees of freedom of the unmanned surface vehicle, and $\psi$ represents a yawing angle of the three degrees of freedom of the unmanned surface vehicle. $C(\mathcal{V})$ represents a Coriolis and centripetal force matrix, and $J(\psi)$ is a transfer matrix, specifically:

$$C(\mathcal{V}) = \begin{bmatrix} 0 & 0 & -m_{22}v \\ 0 & 0 & m_{11}u \\ m_{22}v & -m_{11}u & 0 \end{bmatrix},\ J(\psi) = \begin{bmatrix} \cos\psi & -\sin\psi & 0 \\ \sin\psi & \cos\psi & 0 \\ 0 & 0 & 1 \end{bmatrix}.$$

In combination with the kinetic equation and the kinematical equation, an unmanned surface vehicle dynamic model may be represented as:

$$\begin{cases} m_{11}\dot{u} - m_{22}vr + d_{11}u = \tau_1 \\ m_{22}\dot{v} - m_{11}ur + d_{22}v = 0 \\ m_{33}\dot{r} + (m_{22} - m_{11})uv + d_{33}r = \tau_3 \\ \dot{x} = u\cos\psi - v\sin\psi \\ \dot{y} = u\sin\psi + v\cos\psi \\ \dot{\psi} = r \end{cases} \quad (2)$$

Coordinate transformation is performed based on the formula (2) and is applied to a control system model to obtain an improved mathematical model suitable for mean square stability analysis:

$$\begin{cases} \dot{u} = \frac{1}{m_{11}}(m_{22}vr - d_{11}u + \tau_1) \\ \dot{v} = \frac{1}{m_{22}}(m_{11}ur - d_{22}v) \\ \dot{r} = \frac{1}{m_{33}}((m_{22} - m_{11})uv - d_{33}r + \tau_3) \\ \dot{s}_1 = u + s_2 r \\ \dot{s}_2 = v - s_1 r \\ \dot{s}_3 = r \end{cases} \quad (3)$$

wherein $s_1$, $s_2$ and $s_3$ represent coordinates after transformation.

Further, the formula (3) is transformed into a state-space equation model:

$$\dot{x}(k) = A_0 x(k) + B_0 u(k) \quad (4)$$

wherein $x(k) = [x_1\ x_2\ x_3\ x_4\ x_5\ x_6]^T = [u\ v\ r\ s_1\ s_2\ s_3]^T$ and $u(k) = [u_1\ u_2]^T = [\tau_1\ \tau_3]^T$.

$$A_0 = \begin{bmatrix} -\frac{d_{11}}{m_{11}} & \frac{m_{22}}{m_{11}}x_3 & 0 & 0 & 0 & 0 \\ -\frac{d_{11}}{m_{22}}x_3 & -\frac{d_{22}}{m_{22}} & 0 & 0 & 0 & 0 \\ \frac{m_{11}-m_{22}}{m_{33}}x_2 & 0 & -\frac{d_{33}}{m_{33}} & 0 & 0 & 0 \\ 1 & 0 & 0 & 0 & x_3 & 0 \\ 0 & 1 & 0 & -x_3 & 0 & 0 \\ 0 & 0 & 1 & 0 & 0 & 0 \end{bmatrix} \text{ and}$$

$$B_0 = \begin{bmatrix} \frac{1}{m_{11}} & 0 \\ 0 & 0 \\ 0 & \frac{1}{m_{33}} \\ 0 & 0 \\ 0 & 0 \\ 0 & 0 \end{bmatrix}.$$

S2: the motion mathematical model of the underactuated unmanned surface vehicle established in the step S1 is linearized by a T-S fuzzy method.

When nonlinear terms $x_2$ and $x_3$ exist in a parameter matrix $A_0$, according to the change range of the nonlinear terms, system fuzzy sets: $M_i(x_2(k))$ and $N_i(x_3(k))$ may be determined by the T-S fuzzy method. In combination with a method for transforming a continuous system into a discrete system, the corresponding fuzzy system may be described as:

$r_i$: if $x_2(k)$ belongs to the set $M_i(x_2(k))$ and $x_3(k)$ belongs to the set $N_i(x_3(k))$, $$\begin{cases} x(k+1) = A_i x(k) + B_i u(k) \\ x(k) = \phi(k),\ k \in [-d_M, 0) \end{cases} (i = 1, 2, \cdots r),$$

wherein i is a fuzzy rule number, and $d_M \in \mathbb{N}$ represents a delay upper bound. The overall model of the unmanned surface vehicle fuzzy system is $x(k+1) = Ax(k) + Bu(k)$, wherein $A = \sum_{i=1}^r h_i(x(k)) A_i$, and $B = \sum_{i=1}^r h_i(x(k)) B_i$, $h_i(x(k))$ represents a membership function determined by the fuzzy set.

$M_i(x_2(k))$ and $N_i(x_3(k))$ represent system fuzzy sets, $A_i$ and $B_i$ represent system parameter matrixes of the unmanned surface vehicle, $\phi(k)$ represents a rolling angle, N represents a natural number, and r represents an angular velocity of yawing of the three degrees of freedom of the unmanned surface vehicle.

S3: a switching system analysis model under the DoS attack is established.

Based on a networked unmanned surface vehicle T-S fuzzy control system and in view of the external disturbance such as wind, wave and current in a navigation environment, remodeling is performed to obtain:

$$\begin{cases} x(k+1) = \sum_{i=1}^r \sum_{j=1}^r h_i(x(k)) h_j(\theta(k))[A_i x(k) + B_i K_j e(k) + \\ \qquad B_i K_j x(k-d(k)) + E_i \omega(k)],\ k \in \mathcal{R}_n \\ z(k) = \sum_{i=1}^r h_i(x(k))(C_i x(k) + D_i u(k)) \\ x(k) = \phi(k),\ k \in [-d_M, 0] \end{cases} \quad (5)$$

wherein $\omega(k) = [\omega_1(k)\ \omega_2(k)\ \omega_3(k)]^T$ represents external disturbance such as wind, wave and current in the navigation process, and $z(k)$ represents a state measurement vector. $C_i$, $D_i$ and $E_i$ are real matrixes with appropriate dimensions and respectively represent a measurement state matrix, a measurement input matrix and an environment disturbance matrix of corresponding linear sub-systems, $h_j(\theta(k))$ represents a membership function of the fuzzy controller, $K_j$ represents a controller gain of the fuzzy system, e(k) represents a difference value between the current sampling signal and the last trigger signal, and d(k) represents a variable relevant to communication delay after an event-triggered scheme is established, and $\mathcal{R}_n=[k_t+n+\tau_{k_t+n}, k_{t+1}n+1+\tau_{k_{t+1}+n+1})$.

Under an aperiodic DoS attack, controller input is unable to be transmitted to an actuator unit in the active time period of the DoS attack, then a control input signal is not transmitted at this time. A T-S fuzzy controller for a networked unmanned surface vehicle system may be represented as:

$$u(k) = \begin{cases} \sum_{i=1}^{r} h_j(\theta(k))K_j x(k_{t-1}), k \in \mathcal{D}_{1,n-1} \\ 0, k \in \mathcal{D}_{2,n-1} \end{cases} \quad (6)$$

wherein $\mathcal{D}_{1,n-1}$ and $\mathcal{D}_{2,n-1}$ represent parameter sets.

In combination with the above formula, the switching system analysis model when the unmanned surface vehicle T-S fuzzy control system is subjected to the DoS attack may be represented as:

$$x(k+1) = \begin{cases} \sum_{i=1}^{r}\sum_{j=1}^{r} h_i(x(k))h_j(\theta(k))[A_i x(k) + B_i K_j e(k) + \\ B_i K_j x(k-d(k)) + E_i \omega(k)], k \in D_{1,n-1} \\ \sum_{i=1}^{r}\sum_{j=1}^{r} h_i(x(k))h_j(\theta(k))[A_i x(k) + E_i \omega(k)], k \in D_{2,n-1} \end{cases} \quad (7)$$

$$z(k) = \sum_{i=1}^{r} h_i(x(k))(C_i x(k) + D_i u(k))$$

$$x(k) = \phi(k), k \in [-d_M, 0]$$

S4: an event-triggered scheme and a T-S fuzzy $H_\infty$ controller are designed.

Figure 3:
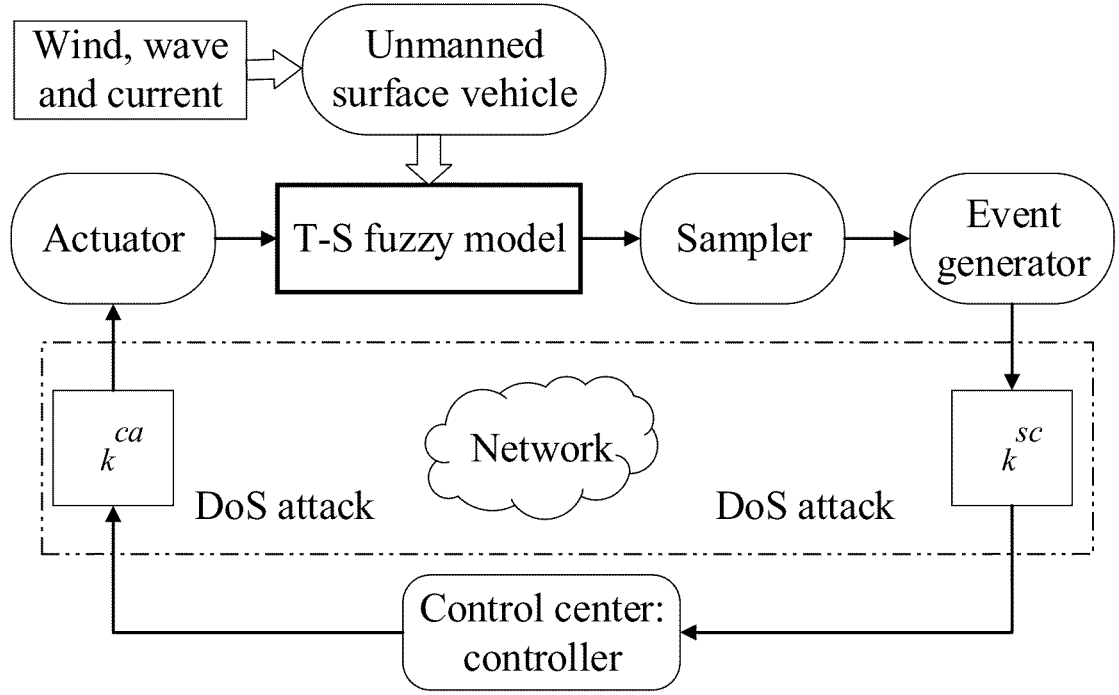
FIG. 3 is a structural composition schematic diagram of an unmanned surface vehicle control system according to an embodiment of the present invention.

In the network environment, state data of the unmanned surface vehicle T-S fuzzy system is transmitted through the network. As shown in FIG. 3, the unmanned surface vehicle control system includes a controlled object, a sampler, an event generator, a control center, an actuator and the like, wherein $\tau^{sc}$ and $\tau^{ca}$ represent data transmission delay in the system.

If the performance of the system tends to be stable or within a controllable range, signal transmission may be reduced to ensure the stability of the system. In the unmanned surface vehicle control system considering communication delay, to reduce data transmission and save network bandwidth resources, the present invention designs an event-triggered mechanism under a discrete system. In FIG. 3, the event-triggered mechanism is performed by the event generator and determines whether the current sampling state should be transmitted to the controller. Assuming that a data signal is generated at the time $k_0$, whether to update the sampling state of the system is determined by comparing the latest transmission state $x(k_t)$ at the trigger time $k_t$ with the current sampling state x(k). Therefore, the next trigger time is determined by the following formula:

$$k_{t+1} = \inf_{k}\{k > k_t \mid [x(k) - x(k_t)]^T W[x(k) - x(k_t)] > \sigma x^T(k_t)Wx(k_t)\} \quad (8)$$

wherein W represents a trigger parameter matrix, and $\sigma$ represents a trigger parameter.

Due to the existence of delay $\tau$, the time when the system state is transmitted to the controller is $k_1+\tau_{k_1}, k_2+\tau_{k_2}, \ldots$ When the T-S fuzzy controller is designed, it is necessary to fully consider the delay, that is, the $j^{th}$ controller rule $j_i$ may be represented as:

$j_i$: if $\theta_1(k)$ belongs to a set $\mu_1^j$, $\theta_2(k)$ belongs to a set $\mu_2^j, \ldots$, and $\theta_p(k)$ belongs to a set $\mu_p^j$, $u(k)=\Sigma_{j=1}^{r}h_j(\theta(k))K_j x(k_t)$, $k \in [k_t+\tau_{k_t}, k_{t+1}+\tau_{k_{t+1}}]$ (j=1, 2, ... r), wherein j is a controller fuzzy rule number, $\theta_g(k)$(g=1, 2, ..., p) represents a premise variable of the fuzzy controller, $h_j(\theta(k))$ represents a membership function of the fuzzy controller and is determined by fuzzy sets respectively according to the nonlinear state quantity range of the control system, $K_j$ represents a controller gain of the fuzzy system, and $\mu_g^j$(g=1, 2, ..., p) represents a fuzzy set.

By combining the above controller equation with the unmanned surface vehicle fuzzy system model in the step S2, a closed loop control equation based on the discrete system may be obtained as follows:

$$x(k+1) = \sum_{i=1}^{r}\sum_{j=1}^{r} h_i(x(k))h_j(\theta(k))[A_i x(k) + B_i K_j x(k_t h)]$$

wherein $x(k_t h)$ represents state information of the controller of the unmanned surface vehicle.

For the convenience of analysis, $\mathcal{R}_{k,t}=[k_t+\tau_{k_t}, k_{t+1}+\tau_{k_{t+1}}]$ is defined, wherein $\tau_{k_t}$ represents delay of the corresponding time $k_t$, and $$R_{k,t} = \bigcup_{n=0}^{n_k} R_n,$$

$\mathcal{R}_n=[k_t+n+\tau_{k_t+n}, k_{t+1}n+1+\tau_{k_{t+1}+n+1})$, n=0,1, ..., $n_k$, and n=0,1, ..., $n_k$. d(k)=k−$k_t$−n, and k∈ $\mathcal{R}_n$. d(k) is communication delay of the system after the event-triggered scheme is considered. The following relationship may be obtained:

$$0 \leq \tau_{k_t} \leq d(k) \leq 1+\max\{\tau_{k_t}, \tau_{k_{t+1}}\} \leq 1+\bar{\tau} \leq d_M$$

wherein $\bar{\tau}$ represents a delay upper bound.

To analyze the relationship between the event-triggered scheme and the system stability, $e(k)=x(k_t)−x(k_t+h)$ is defined, and the final system analysis model may be obtained:

$$\begin{cases} x(k+1) = \sum_{i=1}^{r}\sum_{j=1}^{r} h_i(x(k))h_j(\theta(k))[A_i x(k) + B_i K_j x(k-d(k)) + B_i K_j e(k)], & k \in \mathcal{R}_n \\ x(k) = \mathcal{H}(k), & k \in [-d_M, 0] \end{cases}$$

wherein $\mathcal{H}(k)$ represents an initial state of the unmanned surface vehicle. The event-triggered condition may be determined by a formula $e^T(k)We(k) \leq \sigma x^T(k-d(k))Wx(k-d(k))$. According to the present invention, the update frequency of the sampling signal of the control center can be reduced by introducing the event-triggered mechanism of a discrete time system, such that the bandwidth resource is effectively saved and the transmission pressure of the network is reduced. The designed T-S fuzzy controller may ensure the system stability when the system is underactuated.

S5: an event-triggered matrix W and a controller gain matrix K are calculated.

In the embodiment of the present invention, positive integers $d_M$ and $\delta_l$, a trigger parameter $\sigma \in [0,1)$, $\lambda_1 > 0$, $\mu_2 > 0$, $\mu_1 > 1$, $\mu_2 > 1$, a disturbance suppression parameter $\gamma$, and an aperiodic DoS fixed parameter $\check{k} \in \mathbb{R} \geq 0$, $\hat{k} \in \mathbb{R} \geq 0$, $\tau_D \in \mathbb{R} \geq 0$, $T_D \in \mathbb{R} \geq 0$ are given, if there are symmetrical matrixes $\tilde{W} > 0$, $X_l > 0$, $\tilde{Q}_l > 0$ and $R_l > 0$ ($l=1, 2$), and free weight matrixes with appropriate dimensions $\tilde{M}_{ij}$, $\tilde{N}_{ij}$ and $\tilde{S}_{ij}^{(i,j \in S)}$, S represents a fuzzy rule number, and the following linear matrix inequality is met:

$$\Phi_{ij}(l) + \Phi_{ji}(l) < 0, \quad i \leq j$$

$$\tilde{Y}_1(l) = \begin{bmatrix} \tilde{S}_l & \tilde{M}_l \\ \tilde{M}_l^T & \lambda_l^{d_M} \tilde{R}_l \end{bmatrix} \geq 0$$

$$\tilde{Y}_2(l) = \begin{bmatrix} \tilde{S}_l & \tilde{N}_l \\ \tilde{N}_l^T & \lambda_l^{d_M} \tilde{R}_l \end{bmatrix} \geq 0$$

$$\begin{bmatrix} -\mu_{3-l} X_{3-l} & * \\ X_{3-l} & -X_l \end{bmatrix} \leq 0$$

$$\begin{bmatrix} -\mu_{3-l} \tilde{Q}_{3-l} & * \\ X_{3-l} & \delta_l^2 \tilde{Q} - 2\delta_l X_l \end{bmatrix} \leq 0$$

$$\begin{bmatrix} -\mu_{3-l} \tilde{R}_{3-l} & * \\ X_{3-l} & \delta_l^2 \tilde{R} - 2\delta_l X_l \end{bmatrix} \leq 0 \text{ wherein}$$

$$\Phi_{ij}(l) = \begin{bmatrix} \Psi_{11}^{ij}(l) & * & * & * \\ \Psi_{21}^{ij}(l) & \Psi_{22}(l) & * & * \\ \Psi_{31}^{ij}(l) & 0 & \Psi_{33}(l) & * \\ \Psi_{41}^{ij}(l) & 0 & 0 & \Psi_{44}(l) \end{bmatrix} < 0$$

$$\Psi_{11}^{ij}(l) = \tilde{\prod}(l) + \tilde{\Gamma}_{ij}(l) + \tilde{\Gamma}_{ij}^T(l)$$

$$\Psi_{21}^{ij}(l) = \tilde{\mathcal{A}}_{ij}(l), \Psi_{22}(l) = -X_l$$

$$\Psi_{31}^{ij}(l) = \sqrt{d_M} \tilde{\mathcal{B}}_{ij}(l), \Psi_{33}(l) = \delta_l^2 \tilde{R}_l - 2\delta_l X_l$$

$$\Psi_{41}^{ij}(l) = \tilde{C}_{ij}(l), \Psi_{44}(l) = -I$$

$$\tilde{\prod}(1) = \begin{bmatrix} \tilde{\prod}_{11}(1) & 0 & 0 & 0 & 0 \\ 0 & \sigma \tilde{W} & 0 & 0 & 0 \\ 0 & 0 & -\lambda_1^{d_M} \tilde{Q}_1 & 0 & 0 \\ 0 & 0 & 0 & -\tilde{W} & 0 \\ 0 & 0 & 0 & 0 & -\gamma^2 I \end{bmatrix}$$

$$\tilde{\prod}_{11}(1) = \tilde{Q}_1 - \lambda_1 X_1$$

$$\tilde{\prod}(2) = \begin{bmatrix} \tilde{Q}_2 - \lambda_2 X_2 & 0 & 0 & 0 \\ 0 & 0 & 0 & 0 \\ 0 & 0 & -\lambda_2^{d_M} \tilde{Q}_2 & 0 \\ 0 & 0 & 0 & -\gamma^2 I \end{bmatrix}$$

$$\tilde{\Gamma}_{ij}(1) = [\tilde{M}_1 \quad \tilde{N}_1 \quad -\tilde{M}_1 \quad -\tilde{N}_1 \quad 0 \quad 0]$$

$$\tilde{\Gamma}_{ij}(2) = [\tilde{M}_2 \quad \tilde{N}_2 \quad -\tilde{M}_2 \quad -\tilde{N}_2 \quad 0 \quad 0]$$

$$\tilde{M}_{ij} = [\tilde{M}_{1ij}^T \quad \tilde{M}_{2ij}^T \quad \tilde{M}_{3ij}^T \quad \tilde{M}_{4ij}^T]^T$$

$$\tilde{N}_{ij} = [\tilde{N}_{1ij}^T \quad \tilde{N}_{2ij}^T \quad \tilde{N}_{3ij}^T \quad \tilde{N}_{4ij}^T]^T$$

$$\tilde{S}_{ij} = [\tilde{S}_{1ij}^T \quad \tilde{S}_{2ij}^T \quad \tilde{S}_{3ij}^T \quad \tilde{S}_{4ij}^T]^T$$

$$\tilde{\mathcal{A}}_{ij}(1) = [A_i X_1 \quad B_i Y_j \quad 0 \quad B_i Y_j \quad E_i]$$

$$\tilde{\mathcal{B}}_{ij}(1) = [A_i - X_1 \quad B_i K_j \quad 0 \quad B_i Y_j \quad E_i]$$

$$\tilde{C}_{ij}(1) = [C_i X_1 \quad D_i Y_j \quad 0 \quad D_i Y_j \quad 0]$$

$$\mathcal{A}_{ij}(2) = [A_i X_2 \quad 0 \quad 0 \quad E_i]$$

$$\mathcal{B}_{ij}(2) = [A_i - I \quad 0 \quad 0 \quad E_i]$$

$$C_{ij}(2) = [C_i \quad 0 \quad 0 \quad 0]$$

An event-triggered matrix W and a controller gain matrix $K_j = Y_j X^{-1}$ may be calculated according to the linear matrix inequality.

Figure 4:
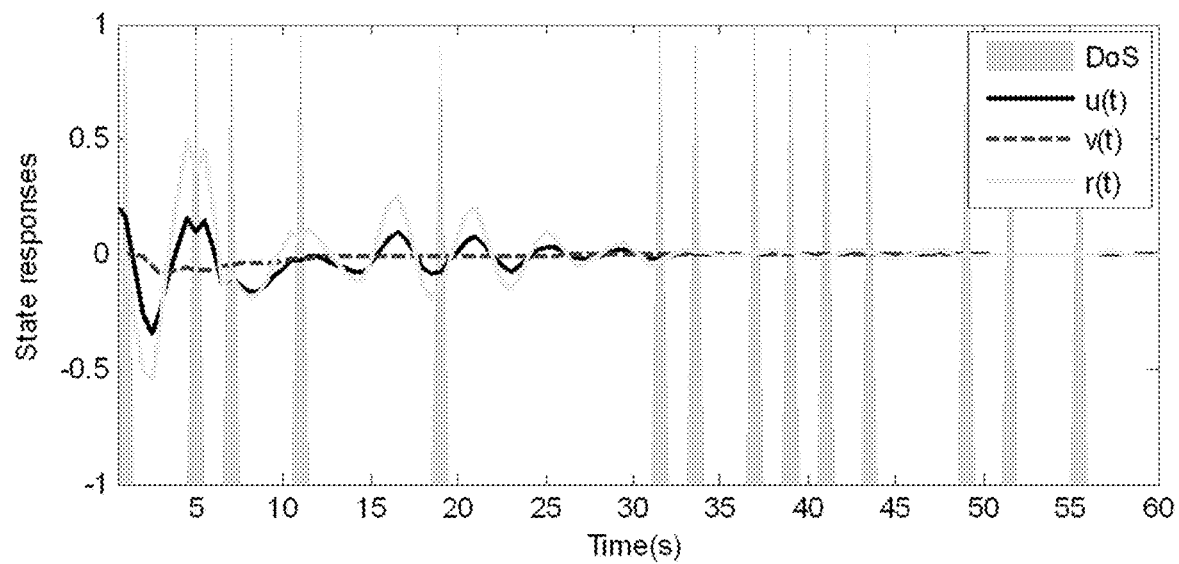
FIG. 4 is a system speed state response curve under an aperiodic DoS attack according to an embodiment of the present invention.
Figure 5:
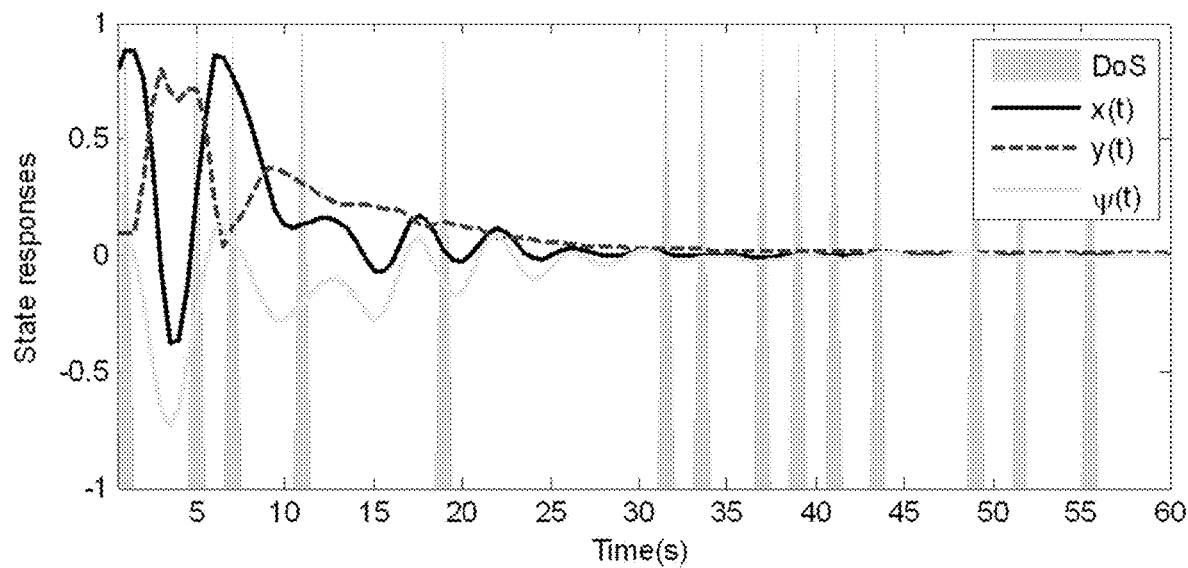
FIG. 5 is a system position state response curve under an aperiodic DoS attack according to an embodiment of the present invention.
Figure 6:
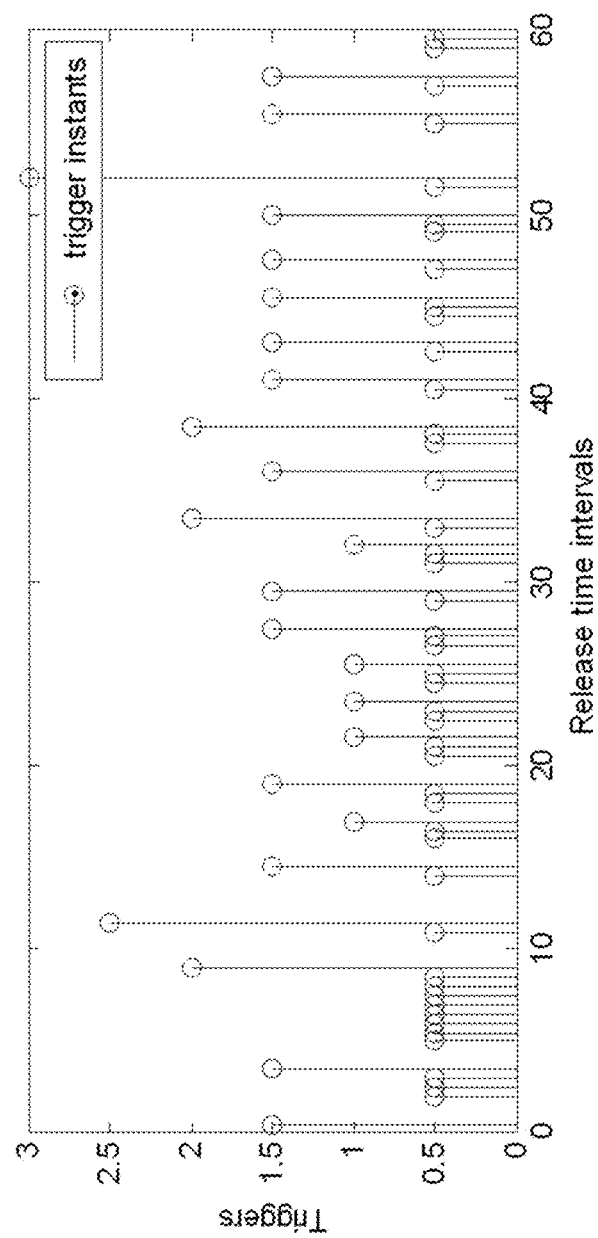
FIG. 6 is an event-triggered sampling interval when $\sigma=0.2$ under a DoS attack according to an embodiment of the present invention.

To verify the effectiveness of the event-triggered scheme and the T-S fuzzy $H_\infty$ controller, trigger parameters are set as $\sigma = 0.2$ and $\gamma = 1.33$. The speed and position response curves of the networked unmanned surface vehicle control system are given in FIG. 4 and FIG. 5, respectively. In the figures, the gray columnar lines represent the occurrence time and the duration of the DoS attack, and in this time period, the network communication channel cannot perform data transmission. The result shows that in this case, the unmanned surface vehicle control system is asymptotically stable, the state of the system is converged to the expected balance point, and the system has good disturbance suppression performance in the case of external disturbance. In addition, when $\sigma = 0.2$, FIG. 6 shows the trigger time of the event generator and the interval between the two adjacent trigger times under the DoS attack, wherein there is no data transmission in the network communication channel in the interval time, thereby reducing the network communication pressure and the network bandwidth requirement. The designed event-triggered scheme can limit unnecessary data transmission through the trigger condition, thereby effectively solving the problem of network communication.

It can be seen from the above simulation experiment analysis that the event-triggered scheme and the T-S fuzzy $H_\infty$ controller collaboratively designed by the present invention may resist the DoS attack and the disturbance of the external environment. On the premise of ensuring the stable navigation of the unmanned surface vehicle, the network communication resource is effectively saved by reducing the data transmission times.

By the collaborative design method based on the event-triggered scheme and the T-S fuzzy $H_\infty$ controller in the network environment according to the present invention, the networked unmanned surface vehicle control system can effectively solve the problem about the motion control of the unmanned surface vehicle while resisting the DoS attack. Reasonable piecewise Lyapunov functionals are established by an analysis method based a switching model, and the mean square stability result of the control system can be obtained according to a linear matrix inequality. For the underactuated and nonlinear characteristics of the system, the T-S fuzzy $H_\infty$ controller is adopted, such that better control effect may be achieved while the design process of the system control rule is simplified.

The present application further provides a computer readable storage medium, for example, a flash memory, a hard disk, a multimedia card, a card type memory (such as an SD or DX memory and the like), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, a server, an application (App) store, etc. A computer program is stored on the computer readable storage medium. The program, when being executed by a processor, enables the processor to implement the unmanned surface vehicle control method based on the switching T-S fuzzy system under the DoS attack in the method embodiments.

Each embodiment of the present description is described in a progressive manner, each embodiment focuses on the difference from other embodiments, and the same and similar parts between the embodiments may refer to each other.

It should be pointed out that according to the needs of implementation, each step/part described in the present application may be divided into more steps/parts, and two or more steps/parts or partial operations of the steps/parts may be combined into a new step/part, thus achieving the objective of the present invention.

It is easy for those skilled in the art to understand that the above are only the preferred embodiments of the present invention, and are not intended to limit the present invention. Any modifications, equivalent substitutions and improvements and the like made within the spirit and principles of the present invention should fall within the protection scope of the present invention.

What is claimed is:

1. An unmanned surface vehicle control method based on a switchable Takagi-Sugeno (T-S) fuzzy control system under a denial of service (DoS) attack, comprising:
    S1: establishing a motion mathematical model of an unmanned surface vehicle having an under-actuated system;
    S2: linearizing the motion mathematical model by a T-S fuzzy method;
    S3: adding external disturbance detected in a navigation process into the linearized motion mathematical model to establish an analysis model of the switchable T-S fuzzy control system under the DoS attack;
    wherein the step S3 comprises:
    S3.1: re-determining the switchable T-S fuzzy control system of the unmanned surface vehicle regarding the external disturbance based on the T-S fuzzy method;
    S3.2: when no aperiodic DoS attack is detected, controlling the unmanned surface vehicle utilizing an actuator; and
    S3.3: in combination with the re-determined switchable T-S fuzzy control system and the switchable T-S fuzzy control system determined under the DoS attack, obtaining the analysis model of the switchable T-S fuzzy control system under the DoS attack:

$$x(k+1) = \begin{cases} \sum_{i=1}^{r}\sum_{j=1}^{r}h_i(x(k))h_j(\theta(k))[A_ix(k) + B_iK_je(k) + \\ B_iK_jx(k-d(k)) + E_i\omega(k)], k \in D_{1,n-1} \\ \sum_{i=1}^{r}\sum_{j=1}^{r}h_i(x(k))h_j(\theta(k))[A_ix(k) + E_i\omega(k)], k \in D_{2,n-1} \end{cases}$$

$$z(k) = \sum_{i=1}^{r}h_i(x(k))(C_ix(k) + D_iu(k))$$

$$x(k) = \phi(k), k \in [-d_M, 0]$$

wherein $\omega(k)=[\omega_1(k)\ \omega_2(k)\ \omega_3(k)]^T$ represents external disturbance in the navigation process, and $z(k)$ represents a state measurement vector, $C_i$, $D_i$ and $E_i$ being real matrixes with appropriate dimensions and respectively represent a measurement state matrix, a measurement input matrix and an environment disturbance matrix of corresponding linear sub-systems, $h_j(\theta(k))$ representing a membership function of the fuzzy controller, $K_j$ representing a controller gain of the fuzzy system, $e(k)$ representing a difference value between the current sampling signal and the last trigger signal, and $d(k)$ representing a variable relevant to communication delay after an event-triggered scheme is established, $\mathcal{R}_n=[k_t+n+\tau_{k_t+n},\ k_{t+1}n+1+\tau_{k_{t+1}+n+1})$, $n=0,1,\ldots,n_k$, $n_k=k_{t+1}-k_t-1$, $k_t$ and $k_{t+1}$ representing the current trigger time and the next trigger time, $\tau_{k_t+n}$ and $\tau_{k_{t+1}+n+1}$ representing delay of a current trigger time and delay of a next trigger time, $D_{1,n-1}$ and $D_{2,n-1}$ representing parameter sets, $\phi(k)$ representing a rolling angle, and $d_M$ representing a delay upper bound;

S4: in response to the analysis model being under the DoS attack, designing an event-triggered mechanism and a T-S fuzzy $H_\infty$ controller under a discrete system; and
   S5: analyzing stability of the switchable T-S fuzzy control system by piecewise Lyapunov functionals so as to verify a gain of the T-S fuzzy $H_\infty$ controller and a weight matrix of the event-triggered mechanism designed in step S4.

2. The method according to claim 1, wherein the step S1 comprises:
    S1.1: considering a hull fixed reference system and an earth fixed reference system, selecting a central position of the unmanned surface vehicle as an origin of coordinates, and obtaining an unmanned surface vehicle dynamic model through a kinetic equation and a kinematical equation of the unmanned surface vehicle in three degrees of freedom of swaying, surging and yawing;
    S1.2: performing coordinate transformation based on the unmanned surface vehicle dynamic model and applying to a control system model to obtain an improved mathematical model suitable for mean square stability analysis; and
    S1.3: transforming the improved mathematical model suitable for mean square stability analysis into a state-space equation model.

3. The method according to claim 2, wherein the improved mathematical model suitable for mean square stability analysis is $$\begin{cases} \dot{u} = \dfrac{1}{m_{11}}(m_{22}vr - d_{11}u + \tau_1) \\ \dot{v} = \dfrac{1}{m_{22}}(m_{11}ur - d_{22}v) \\ \dot{r} = \dfrac{1}{m_{33}}((m_{22} - m_{11})uv - d_{33}r + \tau_3) \\ \dot{s}_1 = u + s_2 r \\ \dot{s}_2 = v - s_1 r \\ \dot{s}_3 = r \end{cases},$$

wherein $m_{11}$, $m_{22}$, $m_{33}$ representing hull inertial parameters, u, v respectively representing linear velocities of surging and swaying of the three degrees of freedom of the unmanned surface vehicle, r representing an angular velocity of yawing of the three degrees of freedom of the unmanned surface vehicle, $d_{11}$, $d_{22}$, $d_{33}$ representing hydrodynamic damping coefficients, $\tau_1$, $\tau_3$ respectively representing a longitudinal propulsive force and a steering torque, and $s_1$, $s_2$ and $s_3$ representing coordinates after transformation.

4. The method according to claim 3, wherein the state-space equation model is $\dot{x}(k) = A_0 x(k) + B_0 u(k)$, wherein $$x(k) = [\, x_1 \ x_2 \ x_3 \ x_4 \ x_5 \ x_6 \,]^T = [\, u \ v \ r \ s_1 \ s_2 \ s_3 \,]^T,$$

$$u(k) = [\, u_1 \ u_2 \,]^T = [\, \tau_1 \ \tau_3 \,]^T,$$

$$A_0 = \begin{bmatrix} -\dfrac{d_{11}}{m_{11}} & \dfrac{m_{22}}{m_{11}}x_3 & 0 & 0 & 0 & 0 \\ -\dfrac{d_{11}}{m_{22}}x_3 & -\dfrac{d_{22}}{m_{22}} & 0 & 0 & 0 & 0 \\ \dfrac{m_{11} - m_{22}}{m_{33}}x_2 & 0 & -\dfrac{d_{33}}{m_{33}} & 0 & 0 & 0 \\ 1 & 0 & 0 & 0 & x_3 & 0 \\ 0 & 1 & 0 & -x_3 & 0 & 0 \\ 0 & 0 & 1 & 0 & 0 & 0 \end{bmatrix}, \text{ and}$$

$$B_0 = \begin{bmatrix} \dfrac{1}{m_{11}} & 0 \\ 0 & 0 \\ 0 & \dfrac{1}{m_{33}} \\ 0 & 0 \\ 0 & 0 \\ 0 & 0 \end{bmatrix}.$$

5. The method according to claim 4, wherein the step S2 comprises:

when nonlinear terms $x_2$ and $x_3$ exist in a parameter matrix $A_0$, according to a change range of the nonlinear terms, determining system fuzzy sets: $M_i(x_2(k))$ and $N_i(x_3(k))$ by the T-S fuzzy method, and in combination with a method for transforming a continuous system into a discrete system, describing the corresponding fuzzy system as:

$r_i$: if $x_2(k)$ belongs to the set $M_i(x_2(k))$ and $x_3(k)$ belongs to the set $N_i(x_3(k))$, $$\begin{cases} x(k+1) = A_i x(k) + B_i u(k) \\ x(k) = \phi(k), k \in [-d_M, 0] \end{cases} (i = 1, 2, \cdots r),$$

i being a fuzzy rule number, $r_i$ representing the $i^{th}$ fuzzy rule, and $d_M \in N$ representing a delay upper bound; and determining an overall model of the switchable T-S fuzzy control system as $x(k+1) = Ax(k) + Bu(k)$, wherein $A = \sum_{i=1}^{r} h_i(x(k)) A_i$, $B = \sum_{i=1}^{r} h_i(x(k)) B_i$, $h_i(x(k))$ represents a membership function determined by the fuzzy set, $M_i(x_2(k))$ and $N_i(x_3(k))$ represent system fuzzy sets, $A_i$ and $B_i$ represent system parameter matrixes of the unmanned surface vehicle, $\phi(k)$ represents a rolling angle, N represents a natural number, and r represents an angular velocity of yawing of the three degrees of freedom of the unmanned surface vehicle.

6. The method according to claim 1, wherein a final analysis model is obtained by $$\begin{cases} x(k+1) = \sum_{i=1}^{r} \sum_{j=1}^{r} h_i(x(k)) h_j(\theta(k)) [A_i x(k) + B_i K_j x(k - d(k)) + B_i K_j e(k)], \ k \in \mathcal{R}_n \\ x(k) = \varkappa(k), \ k \in [-d_M, 0] \end{cases},$$

x(k) representing an initial state of the unmanned surface vehicle; and the described event-triggered scheme is determined by $e^T(k)We(k) \leq \sigma x^T(k-d(k))Wx(k-d(k))$, $n=0, 1, \ldots, n_k$, $n_k = k_{t+1} - k_t - 1$, $k_t$ and $k_{t+1}$ representing the current trigger time and the next trigger time, $\tau_{k_t+n}$ and $\tau_{k_{t+1}+n+1}$ representing delay of the current trigger time and delay of the next trigger time, e(k) representing a difference value between the current sampling signal and the last trigger signal, x(k−d(k)) representing a state of the last trigger time, σ being a trigger parameter, W being the weight matrix of the event-triggered mechanism, and d(k) representing communication delay of the system.

* * * * *